United States Patent
Sowa et al.

(10) Patent No.: US 7,385,619 B2
(45) Date of Patent: Jun. 10, 2008

(54) IMAGE FORMING APPARATUS

(75) Inventors: Takeshi Sowa, Nagano (JP); Nozomu Inoue, Nagano (JP); Yoichi Mitsui, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 203 days.

(21) Appl. No.: 11/070,386

(22) Filed: Mar. 2, 2005

(65) Prior Publication Data
US 2005/0195458 A1    Sep. 8, 2005

(30) Foreign Application Priority Data
Mar. 2, 2004    (JP) .......................... P2004-057130

(51) Int. Cl.
*B41J 2/435* (2006.01)
*G01D 15/14* (2006.01)
(52) U.S. Cl. ...................................... 347/224
(58) Field of Classification Search ............... 347/224; 359/205
See application file for complete search history.

(56) References Cited

U.S. PATENT DOCUMENTS

| | | | |
|---|---|---|---|
| 3,469,030 A | | 9/1969 | Priebe |
| 5,278,589 A | * | 1/1994 | Wong .......................... 347/118 |
| 6,239,894 B1 | * | 5/2001 | Ishibe ........................ 359/205 |
| 6,519,070 B2 | * | 2/2003 | Takayama ................... 359/205 |
| 6,987,594 B2 | * | 1/2006 | Takayama ................... 359/205 |
| 2002/0167709 A1 | * | 11/2002 | Sowa et al. ................. 359/212 |

FOREIGN PATENT DOCUMENTS

| | | |
|---|---|---|
| JP | 56-167129 | 12/1981 |
| JP | 03-065920 | 3/1991 |
| JP | 11-52277 | 2/1999 |
| JP | 2002-258204 | 9/2002 |
| JP | 2002-350753 | 12/2002 |
| JP | 2002-365582 | 12/2002 |
| WO | 03/096101 | 11/2003 |

* cited by examiner

*Primary Examiner*—Hai C Pham
*Assistant Examiner*—Kainoa B Wright
(74) *Attorney, Agent, or Firm*—Hogan & Hartson LLP

(57) ABSTRACT

An optical scanner emits a light beam in accordance with an image forming signal and deflects the light beam in a first direction. A scanned face is adapted to be scanned by the deflected light beam to form a scanning line while being moved in a second direction perpendicular to the first direction, thereby forming a latent image thereon. A virtual scanned face is defined as a plane including the scanning line and orthogonal to an optical axis of the optical scanner. The shape of a beam spot formed by the light beam incident on the virtual scanned face is approximated to an ellipse. The scanned face is inclined from the virtual scanned face so as to rotate about the scanning line, in accordance with an inclined angle of an major axis of the ellipse from the second direction on the virtual scanned face.

7 Claims, 10 Drawing Sheets

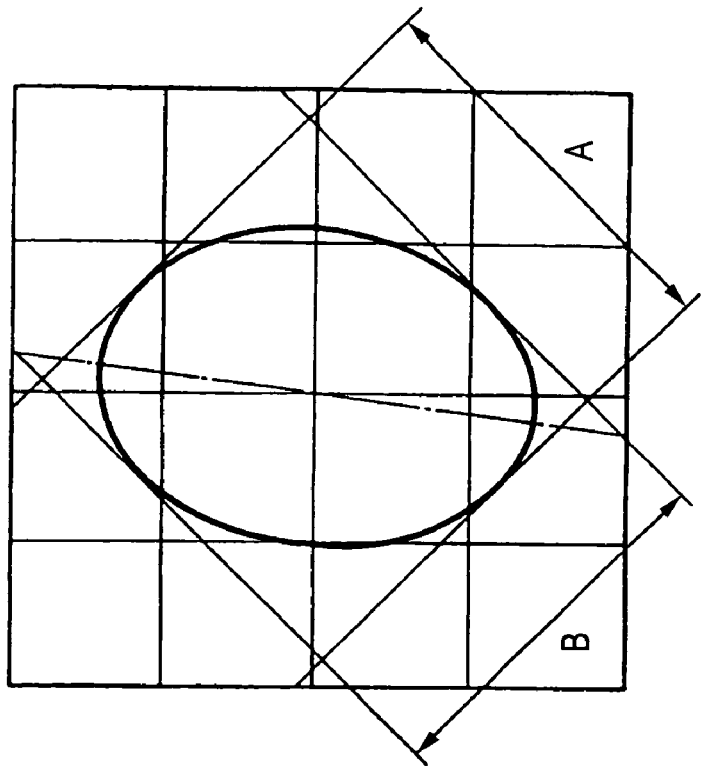
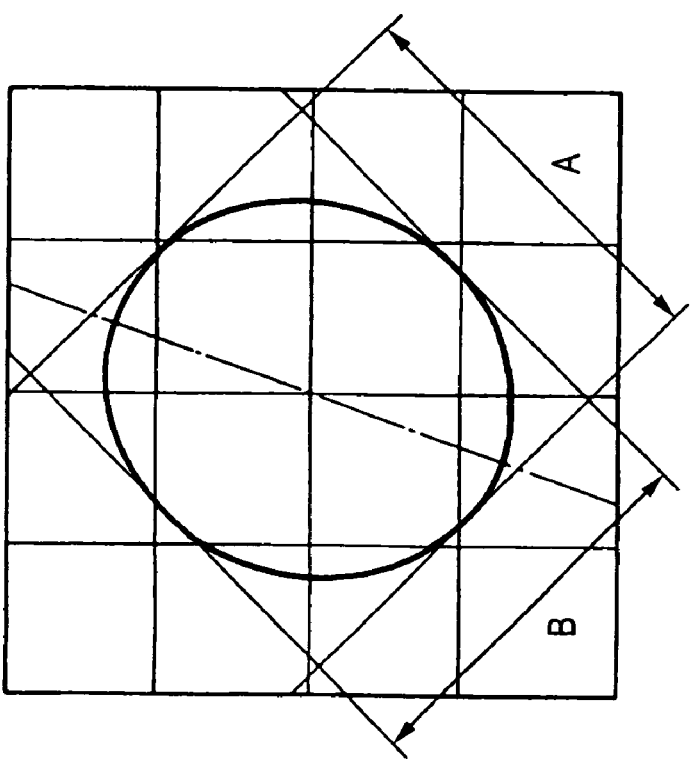
FIG. 2A
FIG. 2B

IMAGE FORMING APPARATUS

BACKGROUND OF THE INVENTION

The present invention relates to an image forming apparatus and more particularly to an image forming apparatus such as an electrophotographic copying machine or an electrophotographic printer comprising an optical scanning device.

Referring to an optical scanning device to be used in an image forming apparatus such as an electrophotographic copying machine or an electrophotographic printer, Japanese Patent Publication No. 2002-365582A teaches conditions for correcting the torsion of a scanning beam (a torsion around the central axis of the beam) in a deflection optical system. Moreover, International Patent Publication No. 03/096101 teaches conditions for correcting the curvature of a scanning path.

However, the conditions for correcting the torsion of a scanning beam and the conditions for correcting the curvature of a scanning path are not coincident with each other in many cases. For this reason, it is necessary to properly balance the inclination of a scanning beam with the curvature of a scanning path in order to equilibrate with image forming characteristics and a lens coverage in an actual optical scanning device. In that case, the torsion of the scanning beam is not corrected perfectly. Alternatively, it is also possible to correct the curvature of a scanning path generated by an eccentrically provided or inclined optical face (a lens face or a reflection face) of a scanning optical system with the conditions taught in Japanese Patent Publication No. 2002-365582A. Also in that case, the torsion is generated on the beam.

When a scanning line obtained by the scanning optical system is included and a perpendicular plane to the optical axis of the scanning optical system is defined to be a virtual scanned face, the inclination of a beam spot formed on the virtual scanned face is more increased apart from a scanning center in a primary scanning direction when the torsion of the scanning beam is not corrected perfectly.

In the deflection optical system disclosed in the publications, incidence is carried out twice over a reflection face.

FIG. 12 shows such an optical system in which a deflector is constituted by a polygon mirror 10 having a plurality of reflection faces 11 (six faces in the drawing) on the side portion of a polyhedral cylinder and the reflection faces 11 are rotated around a rotary axis 12. Two fixed flat mirrors 13 and 14 are disposed so as to face one of the reflection faces 11 subjected to the light deflection. The fixed flat mirrors 13 and 14 are angled relative to each other while forming a gap 15 therebetween.

A light emitted from a light source 21 is converted into a parallel beam a0 through a lens 22. In a case where it is adopted an optical system for correcting a pyramidal angle error of the polygon mirror 10, the light beam emitted from the light source 21 is converted into a parallel light beam relative to a direction perpendicular to the rotation axis 12 of the polygon mirror 10 while being converted into a light beam to be focused in the vicinity of the reflection face 11 of the polygon mirror 10 relative to a direction parallel to the rotation axis 12 of the polygon mirror 10. The light beam a0 passes through the gap 15 between the fixed flat mirrors 13 and 14 and is incident on the reflection face 11 from obliquely below. A light beam a1 obtained by a first reflection through the reflection face 11 advances obliquely upward and is incident on the fixed flat mirror 13. A light beam a2 reflected by the fixed flat mirror 13 advances downward and is incident on the fixed flat mirror 14. A light beam a3 reflected by the fixed flat mirror 14 is incident on the reflection face 11 again. A light beam a4 obtained by a second reflection through the reflection face 11 passes through the gap 15 and advances obliquely upward, and is converted into a focused light beam through a scanning optical system 23 to be incident on a scanned face 24.

Since the reflection face 11 is rotated around the rotary axis 12, the focused light beam is moved at a rotating speed which is approximately four times as high as the rotating speed of the reflection face 11 to draw a scanning line b on the scanned face 24. With the rotation of the polygon mirror 10, the adjacent reflection faces 11 are sequentially subjected to the incident light beam a0. With the rotation of the polygon mirror 10, therefore, the scanning line b is sequentially drawn from one of ends to the other end in the same position on the scanned face 24. A member to be scanned on the scanned face 24 is moved at a constant speed in a perpendicular direction to the scanning line b, resulting in the execution of a raster scan in which the scanning line b is arranged at a constant pitch over the scanned member. When a plane including the central beam of the incident light beam a0 and parallel with the rotary axis 12 is defined as an incident plane, the two fixed flat mirrors 13 and 14 are provided perpendicularly to the incident plane.

It is apparent from the description in connection with FIGS. 19 to 21 in Japanese Patent Publication No. 2002-365582A that the same inclination of a beam spot is generated in a case where an optical system having an optical face provided eccentrically in a secondary scanning direction relative to an optical axis is used in place of the deflection optical system shown in FIG. 12.

In general, the scanned face (photosensitive face) of an electrophotographic printer is inclined relative to the optical axis of an optical scanning device such that the scanned face is rotated about a scanning line as a rotation axis. Such a provision is carried out in order to prevent a light beam reflected by the scanned face from returning to the optical scanning device to cause an unstable laser oscillation, or from being reflected by another optical component in the optical scanning device, thereby becoming ghost light irradiating the scanned face again. Moreover, an incident angle in the primary scanning direction of an incident beam is more increased apart from a scanning center, and the incidence is carried out with an angle in the primary and secondary scanning directions at the scanned face other than the scanning center. For example, even if there is no inclination of a beam spot over the virtual scanned face, the inclination of the beam spot is generated if the scanned face is provided with an inclination in the first and secondary scanning directions relative to the optical axis of the optical scanning device.

Based on a positional relationship between the optical scanning device and the scanned face, the inclinations of the beam spot which are caused by the two factors are combined. Consequently, a fluctuation in characteristics of a beam spot formed on the scanned face within the scanning range is more increased.

SUMMARY OF THE INVENTION

It is therefore an object of the invention to provide an image forming apparatus in which a change in the inclination of a scanning beam spot on the scanned face within the scanning range is suppressed, thereby preventing a density fluctuation and a color fluctuation from being caused.

In order to achieve the above object, according to the invention, there is provided an image forming apparatus, comprising:

an optical scanner, which emits a light beam in accordance with an image forming signal and deflects the light beam in a first direction; and a scanned face, adapted to be scanned by the deflected light beam to form a scanning line while being moved in a second direction perpendicular to the first direction, thereby forming a latent image thereon, wherein:

a virtual scanned face is defined as a plane including the scanning line and orthogonal to an optical axis of the optical scanner;

the shape of a beam spot formed by the light beam incident on the virtual scanned face is approximated to an ellipse; and the scanned face is inclined from the virtual scanned face so as to rotate about the scanning line, in accordance with an inclined angle of an major axis of the ellipse from the second direction on the virtual scanned face.

Here, a positive direction of a first axis is defined as a direction that the light beam is scanned. In addition, a positive direction of a second axis is defined as a direction that the light beam advances through the virtual scanned face in a normal direction thereof. Under these definitions, the scanned face is rotated clockwise as seen in the positive direction of the first axis in a case where the major axis of the ellipse rotates clockwise as seen in the positive direction of the second axis when the beam spot moves in the positive direction of the first axis. On the other hand, the scanned face is rotated counterclockwise as seen in the positive direction of the first axis in a case where the major axis of the ellipse rotates counterclockwise as seen in the positive direction of the second axis when the beam spot moves in the positive direction of the first axis.

According to the invention, there is also provided an image forming apparatus, comprising:

an optical scanner, which emits a light beam in accordance with an image forming signal and deflects the light beam in a first direction; and a scanned face, adapted to be scanned by the deflected light beam to form a scanning line while being moved in a second direction perpendicular to the first direction, thereby forming a latent image thereon, wherein:

a virtual scanned face is defined as a plane including the scanning line and orthogonal to an optical axis of the optical scanner;

the scanned face is inclined from the virtual scanned face so as to rotate about the scanning line, thereby a first part of the scanned face comes close to the optical scanner and a second part of the scanned face comes apart from the optical scanner; and a first distance is defined as a distance between a first end in the second direction of the beam spot on the virtual scanned face at a first position on the scanning line and the first end in the second direction of the beam spot on the virtual scanned face at a second position on the scanning line;

a second distance is defined as a distance between a second end in the second direction of the beam spot on the virtual scanned face at the first position and the second end in the second direction of the beam spot on the virtual scanned face at the second position;

a first part of the virtual scanned face corresponding to the first part of the scanned face includes the first end or the second end which defines a larger one of the first distance and the second distance when a difference between the first distance and the second distance becomes maximum; and a second part of the virtual scanned face corresponding to the second part of the scanned face includes the first end or the second end which defines a smaller one of the first distance and the second distance when the difference between the first distance and the second distance becomes maximum Preferably, the optical scanner comprises a light source which emits the light beam, and a reflection face which reflects the light beam coming from the light source while deflecting in the first direction. Here, the light beam is incident onto the reflection face obliquely in the second direction relative to the optical axis.

Preferably, the optical scanner comprises an optical system which focuses the deflected light beam onto the scanned face. Here, at least one optical face in the optical system is eccentrically provided relative to the optical axis. Alternatively, at least one optical face in the optical system is inclined in the second direction relative to the optical axis.

Preferably, the optical scanner comprises: a light emitter, which emits the light beam; a movable reflection face, which reflects the light beam coming from the light source; and at least two fixed reflection faces, which reflect light beam once reflected by the movable reflection face so as to return the light beam to the movable reflection face again, thereby the light beam twice reflected by the movable reflection face is deflected in the first direction.

In a case where the latent image is for a monochrome image, it is preferable that a difference between maximum and minimum values of a distortion level of the beam spot on the scanning line is not greater than 35%. Here, the distortion level of the beam spot is defined by the following equation,:

$$(A-B)/\min(A, B) \times 100(\%)$$

where A represents a dimension in a direction of an inclination at +45 degrees relative to the first direction when an intensity of the beam spot becomes 17% of a peak intensity; B represents a dimension in a direction of an inclination at −45 degrees when an intensity of the beam spot becomes 17% of a peak intensity, relative to the first direction; and "min (A, B)" represents A or B which is smaller.

In a case where the latent image is for a color image obtained by superposing a plurality of monochrome images one on another, it is preferable that the difference between maximum and minimum values of the distortion level of the beam spot on the scanning line is not greater than 25%.

BRIEF DESCRIPTION OF THE DRAWINGS

The above objects and advantages of the present invention will become more apparent by describing in detail preferred exemplary embodiments thereof with reference to the accompanying drawings, wherein:

FIGS. 2A and 2B are diagrams showing examples of beam spots having different inclination angles and an identical distortion level;

DETAILED DESCRIPTION OF THE INVENTION

Embodiments of the invention will be described with reference to the accompanying drawings.

As described above, a plane including a scanning line obtained by a scanning optical system and perpendicular to the optical axis of the scanning optical system is defined as a virtual scanned face. The cross sectional shape of a scanning beam on a virtual scanned face or an actual scanned face (defined when it is inclined relative to the virtual scanned face) is defined as a beam spot. A torsion around the central axis of the scanning beam is defined as the inclination of the beam spot (a more detailed definition will be described below).

First of all, description will be given to the reason why it is not preferable that the inclination of the beam spot is changed within a scanning range.

Figure 1C:
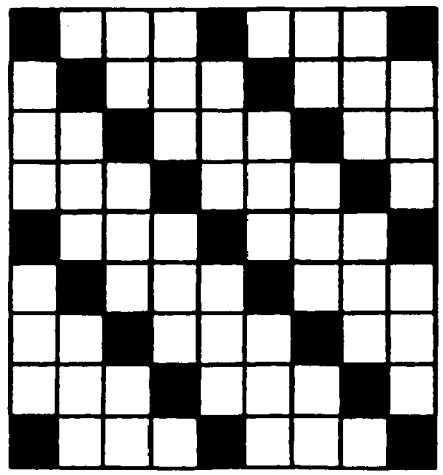
FIGS. 1B and 1C are diagrams showing a relationship between an inclined angle of stripes in the screen structure of FIG. 1A and an inclined angle of a beam spot.
Figure 1B:
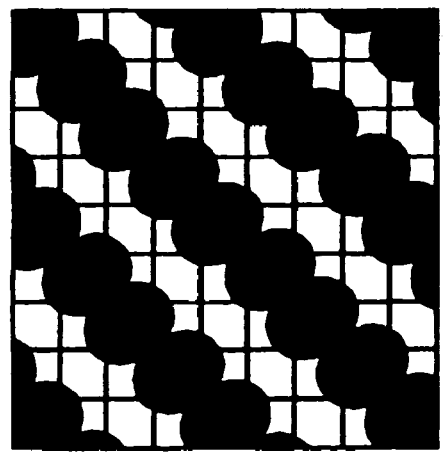
Figure 1A:
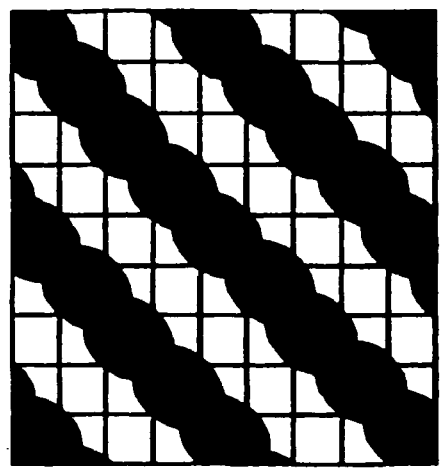
FIG. 1A is a diagram showing one example of a screen structure used in an image forming apparatus.

In an image forming apparatus such as an electrophotographic printer, generally, a screen structure is changed for representing the density gradation of an image. For example, there is a screen structure in which black dots are connected so as to form oblique stripes as the density level increases as shown in FIG. 1A.

In such a case, a difference is made on the density of a latent image formed on a photosensitive member in accordance with an angle of the oblique stripes (45 degrees in FIG. 1A) and an inclination angle of the beam spot. FIG. 1B shows a case where an inclination in the direction of the major axis of the beam spot is perpendicular to the extending direction of the oblique stripes. FIG. 1C shows a case where the inclination in the direction of the major axis of the beam spot is almost the same as the extending direction of the oblique stripes.

In a case where a degree of contribution of a beam irradiation area is high with respect to an image density by the influence of the energy of the beam spot, the sensitivity characteristic of the photosensitive member, and a developing characteristic, the density is higher in FIG. 1B than that in FIG. 1C. In a case where a degree of contribution of the electric potential of a written latent image to the image density is high, the density is higher in FIG. 1C than that in FIG. 1B because the overlap of adjacent beam spots to each other is greater in the former case. When the inclination of the beam spot is changed within a scanning range (during the primary scanning), consequently, a density fluctuation is generated in the primary scanning direction.

In a case where a plurality of monochrome images are caused to overlap each other to form a color image in a color laser printer, furthermore, the angle of the screen is generally varied for each color in order to avoid an interference between different color screens. When the inclination of the beam spot is changed within the scanning range in such an image forming apparatus, a color fluctuation in the primary scanning direction is generated.

Herein, the inclination angle of the beam spot and the distortion level of the beam spot are defined.

In a case where the shape of the beam spot is approximated to an ellipse, the inclination angle of the beam spot is defined by an angle formed by the major axis of the ellipse and a secondary scanning direction which is orthogonal to the primary scanning direction.

It is hard to correspond the inclination angle of the beam spot to an image defect depending on the shape of the beam spot (a ratio of a spot diameter in the primary scanning direction to a spot diameter in the secondary scanning direction). Therefore, the distortion level of the beam spot is defined as a management parameter which well corresponds to the image defect.

The distortion level of the beam spot is defined by the following Equation (1):

$$(A-B)/\min(A, B) \times 100(\%) \qquad (1)$$

where A represents a dimension in a direction of an inclination at +45 degrees relative to the primary scanning direction when an intensity of the beam spot becomes 17% of a peak intensity; B represents a dimension in a direction of an inclination at −45 degrees when an intensity of the beam spot becomes 17% of a peak intensity, relative to the primary scanning direction; and "min (A, B)" represents A or B which is smaller.

Experientially, the distortion level of the beam spot when the dimensions of the beam spot are defined by using the above intensity values well corresponds to the density fluctuation of a monochromatic image or the color fluctuation of a color image.

FIG. 2A shows a beam spot having an inclination angle of 20 degrees and a distortion level of 7%, and FIG. 2B shows a beam spot having an inclination angle of 7 degrees and a distortion level of 7%. In FIGS. 2A and 2B, an axis of abscissa indicates the primary scanning direction. It is apparent that the inclination angle of the beam spot can be greatly varied depending on the shape of the beam spot although the distortion level is the same. The distortion level of the beam spot well corresponds to the density fluctuation and the color fluctuation, and it is preferable that an evaluation should be carried out from a variation within the scanning range of the distortion level of the beam spot in place of the inclination angle of the beam spot in order to prevent the density fluctuation and the color fluctuation in the primary scanning direction from being remarkable.

In case of a monochromatic image, experientially, it is preferable that a difference between the maximum and minimum values of the distortion level of the beam spot within the scanning range is equal to or smaller than 35%. In case of a color image in which images having a plurality of monochrome images are caused to overlap each other, it is well known that the difference between the maximum and minimum values of the distortion level of the beam spot within the scanning range is preferably equal to or smaller than 25%.

Figure 3:
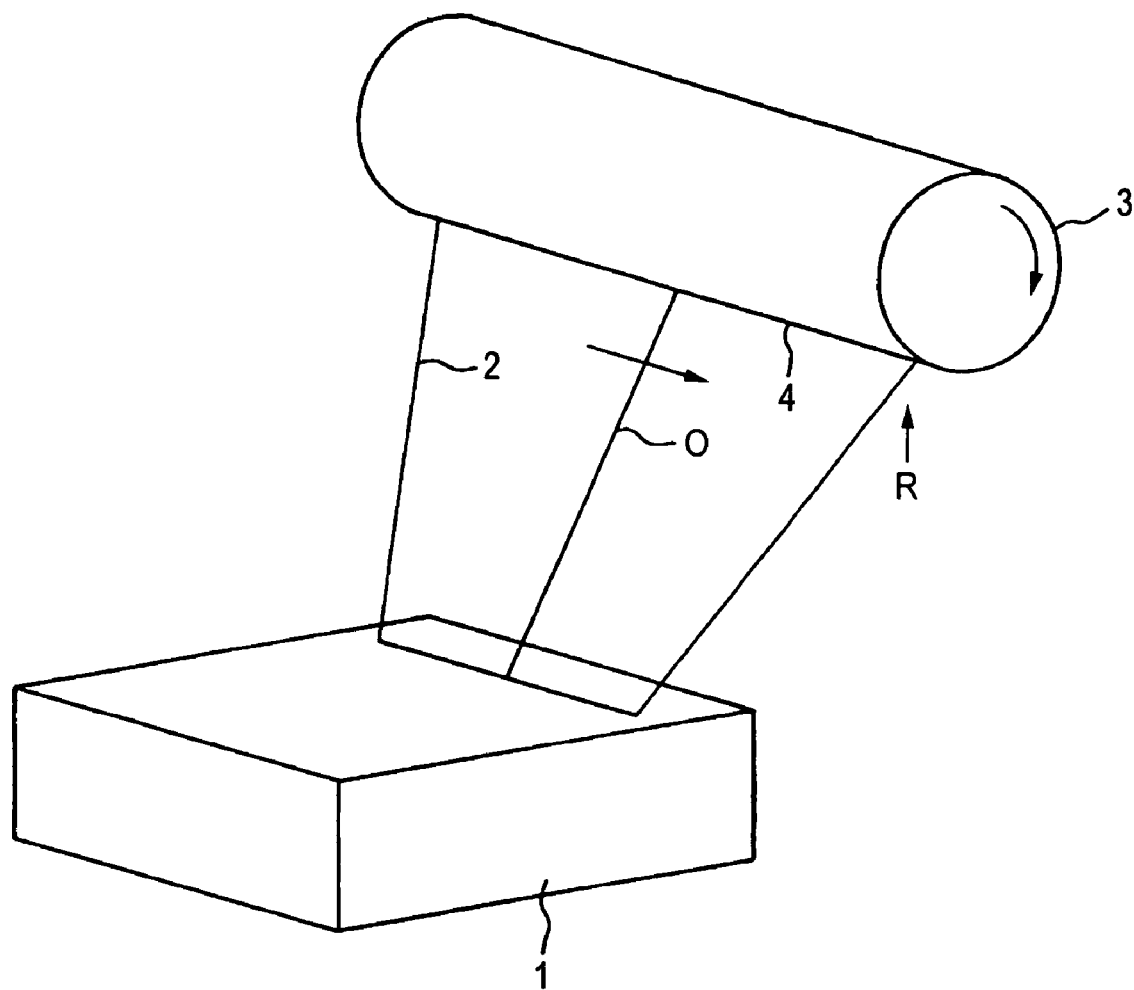
FIG. 3 is a schematic perspective view of an image forming apparatus according to the invention.

Next, description will be given to a principle for suppressing a change in the inclination of a scanning beam spot within a scanning range according to the invention. As shown in FIG. 3, a scanning beam 2 transmitted from a scanning device 1 is subjected to a primary scanning in a direction of an arrow to form a scanning line 4 in the direction of the bus of a photosensitive drum 3 in an electrophotographic printer. The photosensitive drum 3 is rotated in a direction of an arrow to carry out a secondary scanning, thereby forming a latent image on a photosensitive layer at the surface of the photosensitive drum 3. There will be considered the scanning beam 2 in the vicinity of a right end R of the scanning line 4.

In general, since the scanned face 6 is provided in the vicinity of the beam waist of the scanning beam 2, it is assumed that the amount of a shift of the scanned face 6 from the virtual scanned face 5 in an orthogonal direction by the inclination of the scanned face 6 is sufficiently small in comparison with a focal depth, and that the light flux of the scanning beam 2 in the vicinity of the scanned face 6 is approximated to an elliptical cylinder. Under these assumptions, there will be considered how a beam spot having no inclination at the virtual scanned face changes its shape on the scanned face 6 inclined in the secondary scanning direction so as to rotate about the scanning line 4.

Figure 4A:
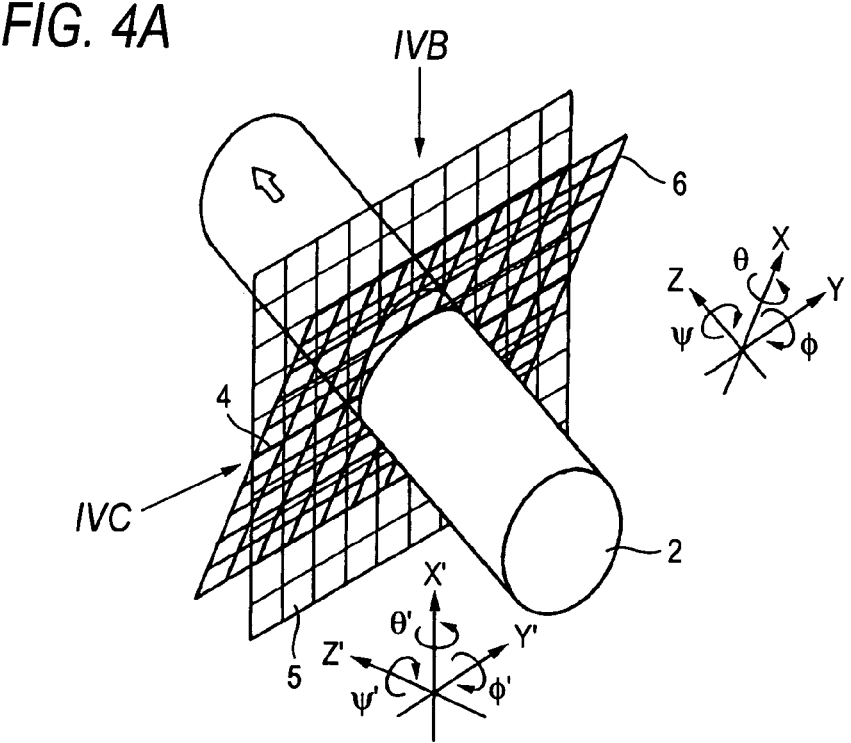
FIG. 4A is a diagram showing a relationship between a virtual scanned face and an actual scanned face.
Figure 4B:
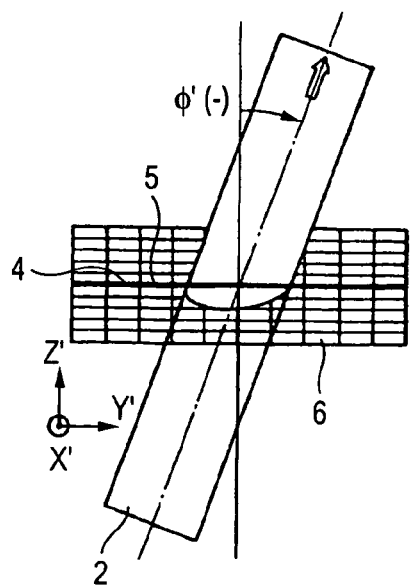
FIG. 4B is a diagram viewed from an arrow IVB in FIG. 4A.
Figure 4C:
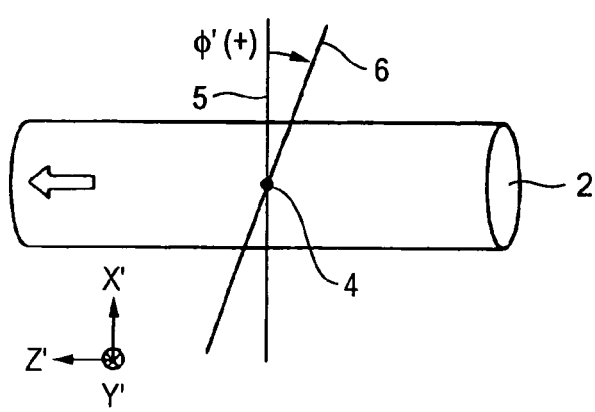
FIG. 4C is a diagram viewed from an arrow IVC in FIG. 4A.

With reference to FIGS. 4A to 4C, a coordinate system is defined. An X'-Y' coordinate is defined on the virtual scanned face 5, and a Y'-axis is caused to be coincident with the scanning line 4. A direction from the left to the right of the virtual scanned face 5 is set to be a Y'-axis positive direction. Moreover, a secondary scanning direction is caused to be coincident with an X'-axis and a direction from the bottom to the top of the virtual scanned face 5 is set to be an X'-axis positive direction. An orthogonal direction to the virtual scanned face 5 is caused to be coincident with a Z'-axis and a direction that the scanning beam 2 advances (a direction of a blank arrow in the drawings) is set to be a Z'-axis positive direction.

Similarly, an X-Y-Z coordinate is also defined for the scanned face 6.

In an X'-Y'-Z' coordinate system, a clockwise rotating angle seen in the X'-axis positive direction is set to be $\theta'$, a clockwise rotating angle seen in the Y'-axis positive direction is set to be $\phi'$ and a clockwise rotating angle in the Z'-axis positive direction is set to be $\psi'$. In an X-Y-Z coordinate system, similarly, a clockwise rotating angle seen in an X-axis positive direction is set to be $\theta$, a clockwise rotating angle seen in a Y-axis positive direction is set to be $\phi$ and a clockwise rotating angle in a Z-axis positive direction is set to be $\psi$.

Figure 5:
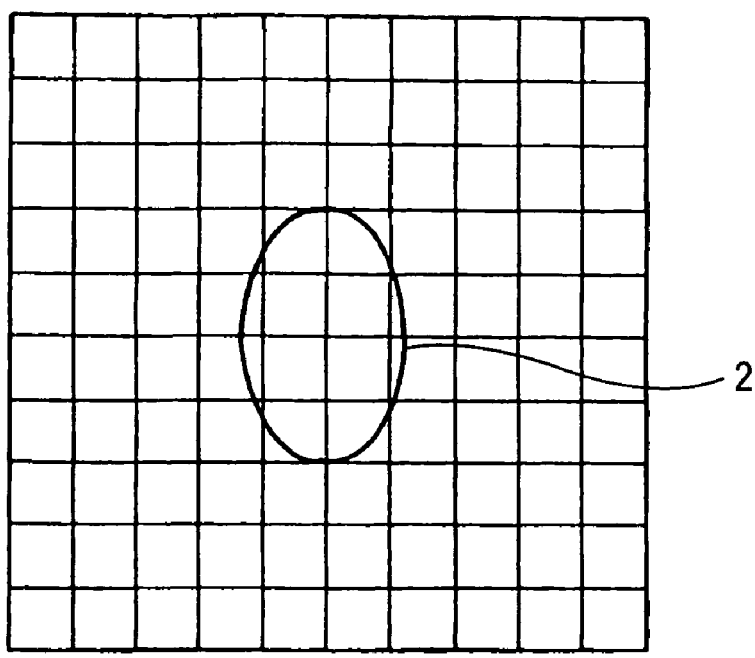
FIG. 5 is a diagram showing the shape of a beam spot on the virtual scanned face in the vicinity of the center of a scanning line.
Figure 6:
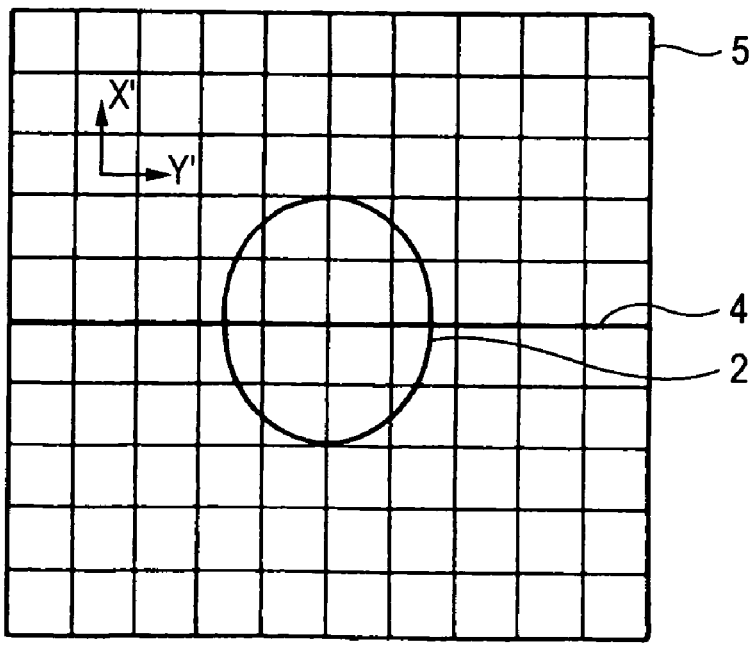
FIG. 6 is a diagram showing the shape of the beam spot on the virtual scanned face at a position R in FIG. 3.

It is assumed that a shape in a perpendicular section to the scanning beam 2 is approximated to an ellipse is not inclined relative to the secondary scanning direction as shown in FIG. 5. In the vicinity of the right end R of the scanning line 4, the scanning beam 2 is incident on the virtual scanned face 5 with an inclined angle of $\theta$ in a negative direction around the X'-axis. In this situation, an elliptical beam spot is more expanded in the Y' direction as shown in FIG. 6. However, the beam spot has no inclination.

Figure 7A:
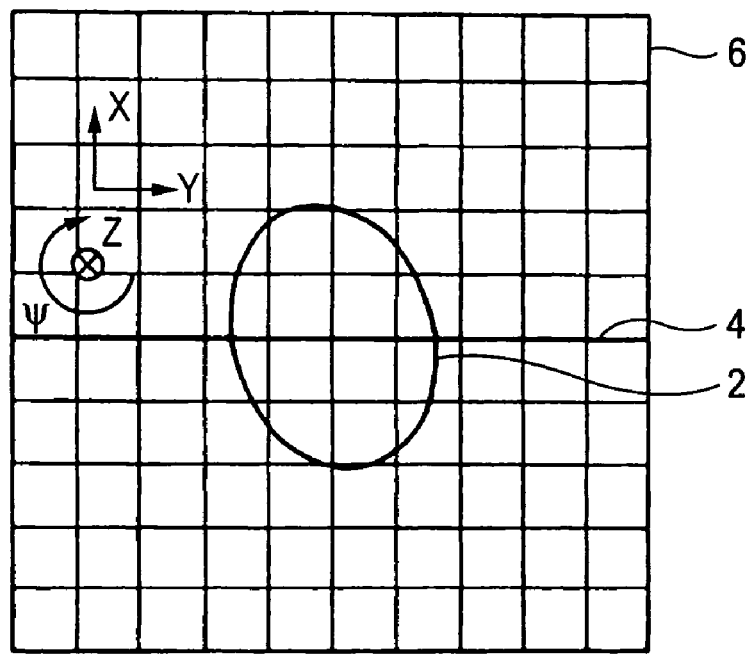
FIG. 7A is a diagram showing the shape of the beam spot on the scanned face in a case where the beam spot has a negative inclined angle.
Figure 7B:
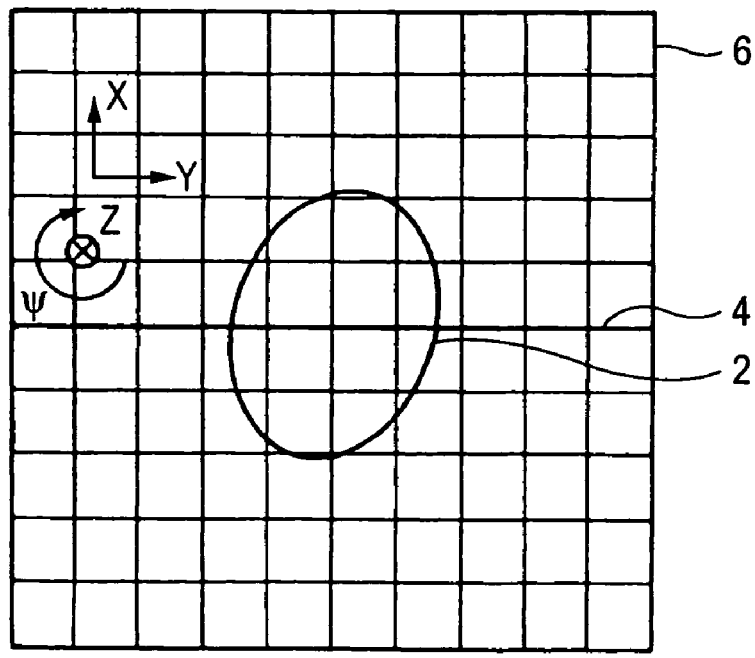
FIG. 7B is a diagram showing the shape of the beam spot on the scanned face in a case where the beam spot has a positive inclined angle.

In a case where the scanned face 6 is provided with an inclination of $\phi'$ in a positive direction around the scanning line 4 (=Y'-axis) with respect to the virtual scanned face 5 as shown in FIG. 4C, the upper side of the scanning beam 2 approximated to the elliptical cylinder crosses the scanned face 6 before the virtual scanned face 5. Therefore, the upper side of the beam spot formed on the scanned face 6 has a smaller value in the Y-axis as shown in FIG. 4B. On the other hand, the lower side of the scanning beam 2 crosses the scanned face 6 after the virtual scanned face 5. Therefore, the lower side of the beam spot formed on the scanned face 6 has a larger value in the Y-axis. Namely, as shown in FIG. 7A, the inclination angle $\psi$ of the beam spot at the scanned face 6 has a negative value. To the contrary, in a case where the scanned face 6 is provided with an inclination angle of $\phi'$ in a negative direction around the scanning line 4 (=Y'-axis), the inclination angle $\psi$ of the beam spot at the scanned face 6 has a positive value as shown in FIG. 7B.

Figure 8:
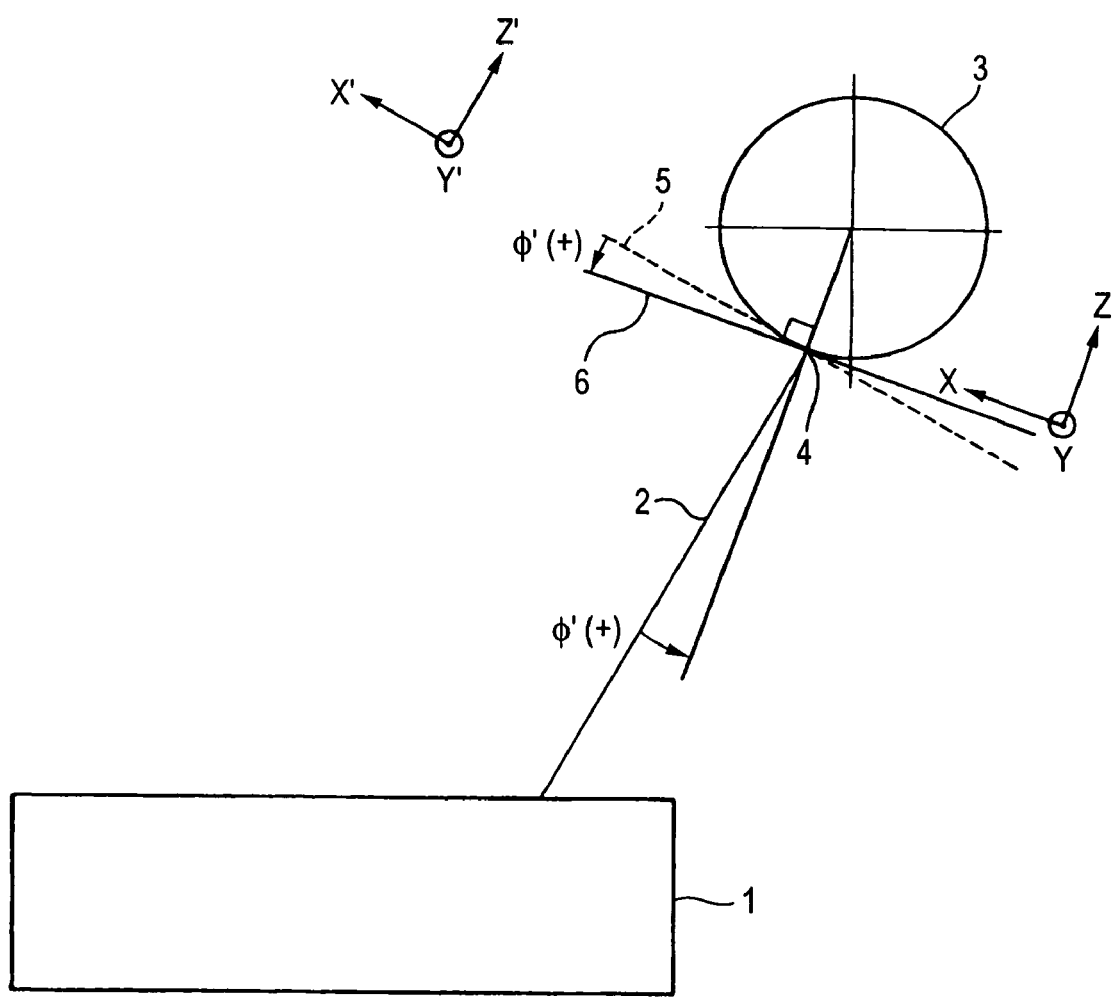
FIG. 8 is a schematic side view of an image forming apparatus.
Figure 9A:
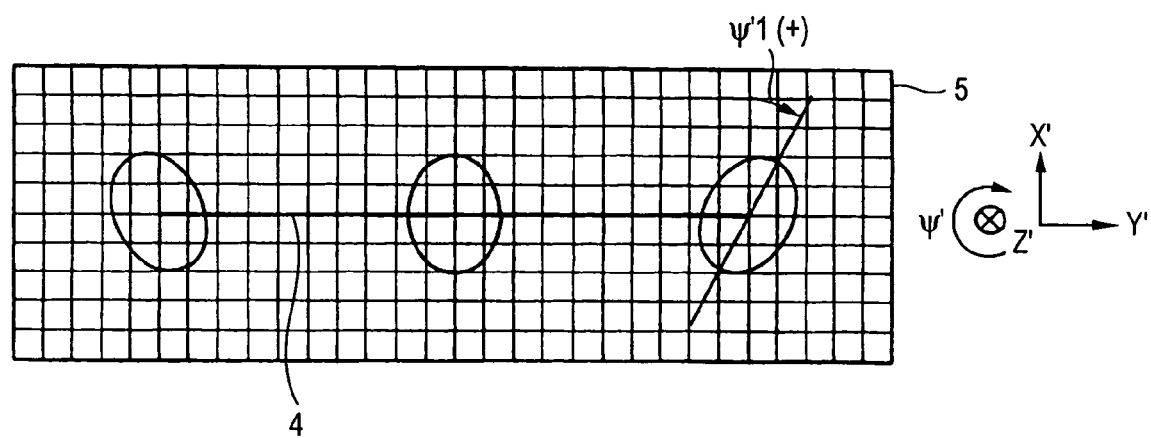
FIG. 9A is a diagram showing the shapes of beam spots on the virtual scanned face in the image forming apparatus of FIG. 8.
Figure 12:
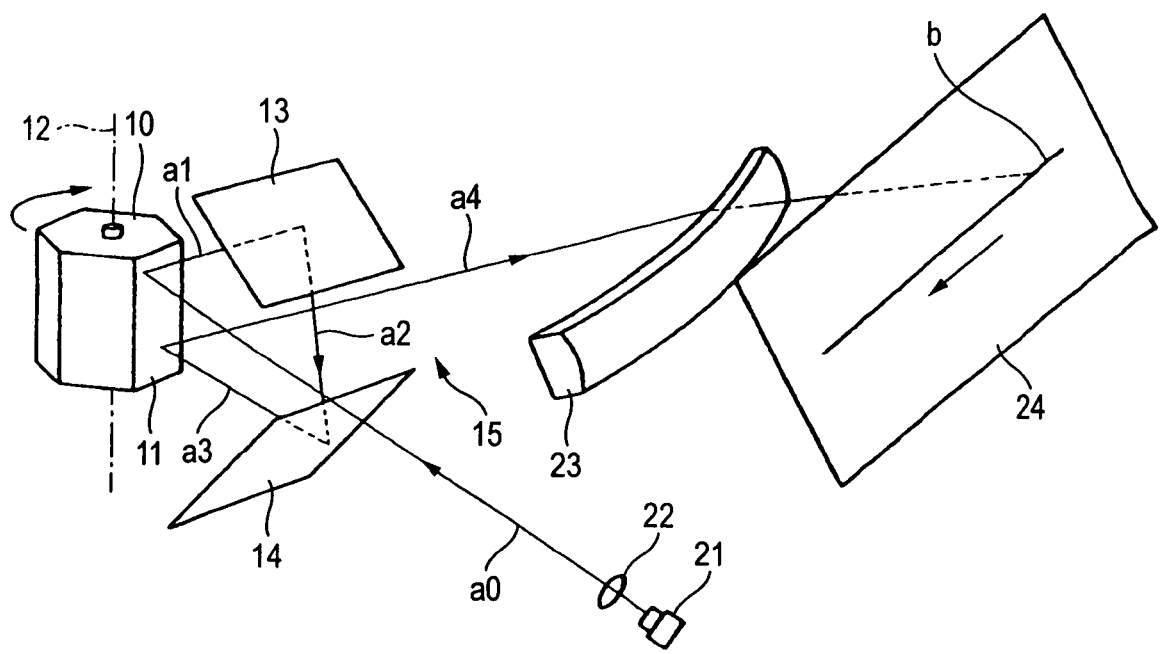
FIG. 12 is a schematic perspective view of a deflection optical system in which a light beam is incident on a reflection face of a deflector twice.

In a case where the deflection optical system shown in FIG. 12 is used and when the inclination angle $\psi'$ of the beam spot on the virtual scanned face is changed from a negative to a positive in the Y'-axis positive direction as shown in FIG. 9A, the scanned face 6 which is defined as a tangential plane of the photosensitive drum 3 at the scanning line 4 is inclined from the virtual scanned face 5 by a positive inclined angle of $\phi'$ around the Y'-axis as shown in FIG. 8. As a result, the inclination of the beam spot is cancelled so that a change in an inclination angle of the beam spot on the scanned face 6 can be reduced. Therefore, the density fluctuation of a monochromatic image and the color fluctuation of a color image can be reduced.

To the contrary, in a case where a change in the inclination angle $\psi'$ of the beam spot is opposite to that in FIG. 9A, it is necessary to incline the scanned face 6 from the virtual scanned face 5 with a negative inclined angle of $\phi'$ which is opposite to the direction of FIG. 8.

Figure 9B:
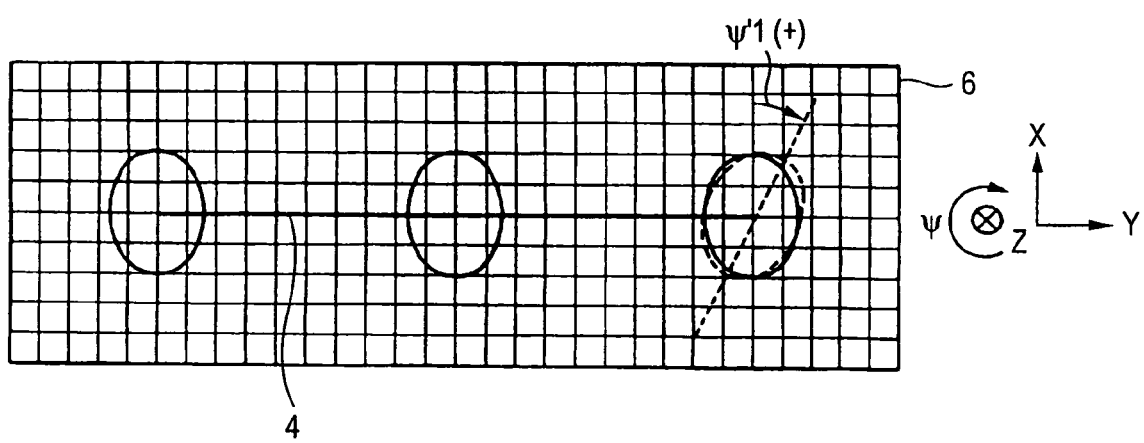
FIG. 9B is a diagram showing the shapes of beam spots on the scanned face in the image forming apparatus of FIG. 8.

In other words, the scanned face 6 is inclined from the virtual scanned face 5 so as to rotate about the scanning line 4, thereby a first part of the scanned face (the upper half of the scanned face 6 shown in FIG. 9B) comes close to the optical scanner and a second part of the scanned face (the lower half of the scanned face 6 shown in FIG. 9B) comes apart from the optical scanner. Specifically, a first distance is defined as a distance between a first end in the secondary scanning direction of the beam spot 2 on the virtual scanned face 5 at a first position on the scanning line 4 and the first end in the secondary scanning direction of the beam spot 2 on the virtual scanned face 5 at a second position on the scanning line 4. A second distance is defined as a distance between a second end in the secondary scanning direction of the beam spot 2 on the virtual scanned face 5 at the first position and the second end in the second direction of the beam spot 2 on the virtual scanned face 5 at the second position. A first part of the virtual scanned face (the upper half of the virtual scanned face 5 shown in FIG. 9A) corresponding to the first part of the scanned face includes the first end or the second end which defines a larger one of the first distance and the second distance when a difference between the first distance and the second distance becomes maximum. A second part of the virtual scanned face (the upper half of the virtual scanned face 5 shown in FIG. 9A)

corresponding to the second part of the scanned face includes the first end or the second end which defines a smaller one of the first distance and the second distance when the difference between the first distance and the second distance becomes maximum. According to such a rotation of the scanned face 6, the change in the inclination angle of the beam spot in accordance with the movement of the beam spot along the scanning line 4 can be reduced, so that the density fluctuations in the monochrome image and the color fluctuation in the color image can be suppressed.

It is preferable that the inclination angle φ' of the scanned face 6 from the virtual scanned face 5 should be selected in such a manner that the inclination angle of a beam spot in the vicinity of the end of the scanning line 4 becomes zero. As described above, when the difference between the maximum and minimum values of the distortion level of the beam spot within the scanning range is equal to or smaller than 35% in the case of a monochromatic image and is equal to or smaller than 25% in the case of a color image, the density fluctuation of the monochromatic image and the color fluctuation of the color image can be further reduced.

Figure 10:
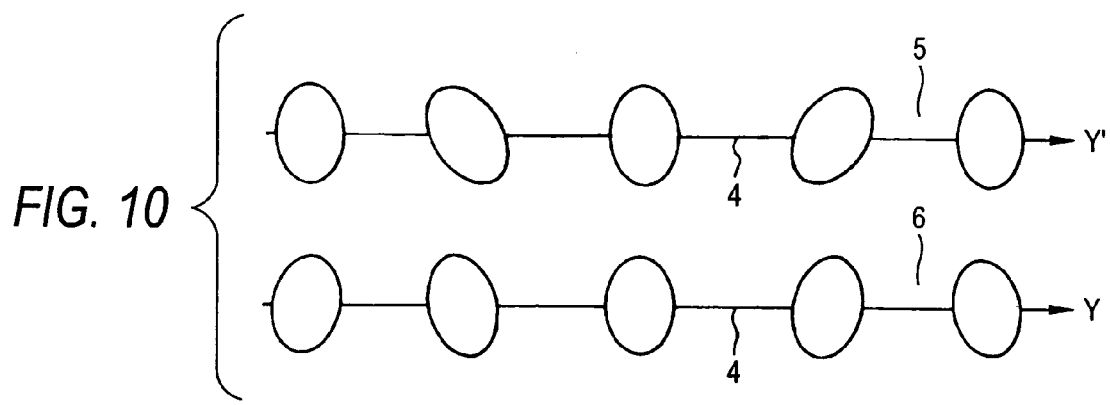
FIG. 10 is a diagram showing correction of the inclination of beam spots in a case where the inclined angle becomes the largest at a position between the center and the end of the scanning line.

The inclination of the beam spot is not always maximized or minimized at the end of the scanning line 4, and depends on the shape of the optical face in the scanning optical system. As shown in FIG. 10, the inclined angle may become the largest at a position between the center and the end of the scanning line 4. Also in such a case, by inclining the scanned face 6 properly as discussed the above, a change in the inclination angle of the beam spot on the scanned face 6 within the scanning range can be reduced.

Figure 11:
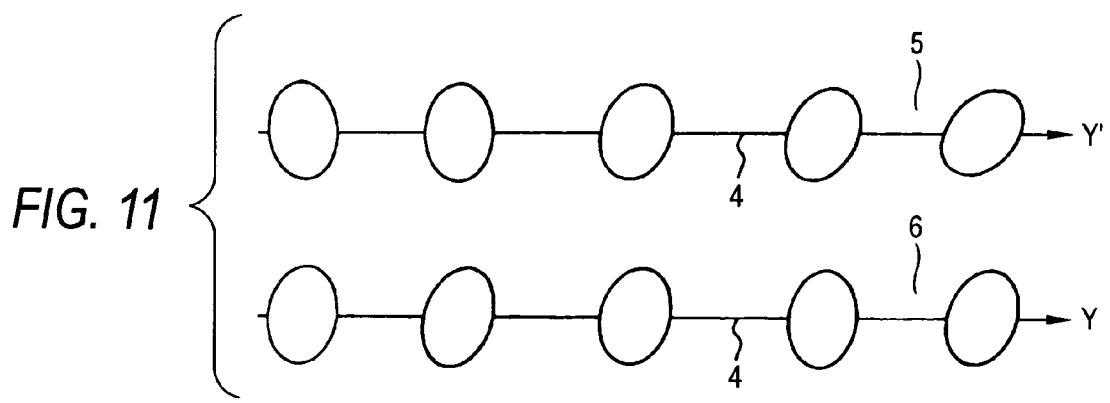
FIG. 11 is a diagram showing correction of the inclination of beam spots in a case where the inclined angle changes asymmetrically relative to the scanning center.

Moreover, the beam spot is not always inclined symmetrically with respect to the optical axis of the scanning optical system as shown in FIG. 11. Also in a such case, by inclining the scanned face 6 properly as discussed the above, a change in the inclination angle of the beam spot on the scanned face 6 within the scanning range can be reduced.

Examples of the scanning device 1 in which the inclination angle ψ' of the beam spot changes as shown in FIG. 9A include an optical scanning device for causing a light beam to be incident obliquely in a secondary scanning direction with respect to the reflection face of an optical deflector such as a rotary polygon mirror, and an optical scanning device in which at least one optical face (a lens plane or a reflection face) of the scanning optical system for focusing a light beam deflected by a deflector on a scanned face is provided eccentrically relative to the optical axis of the scanning optical system or is provided with an inclination in the secondary scanning direction relative to the optical axis of the scanning optical system. Furthermore, it is possible to take, as an example, an optical scanning device shown in FIG. 12.

In such a case, it is preferable that the scanned face 24 should be provided with an inclination in a direction orthogonal to both of the primary and secondary scanning directions from the reference plane (the virtual scanned face) in order to suppress a change in the inclination of the beam spot over the scanned face 24 and to prevent a density fluctuation and a color fluctuation from being caused according to the invention.

While the image forming apparatus according to the invention has been described above based on the principle and the examples, the invention is not restricted to the examples but various changes can be made.

What is claimed is:

1. An image forming apparatus, comprising:
an optical scanner, which emits a light beam in accordance with an image forming signal and deflects the light beam in a first direction; and
a photosensitive drum, having an outer circumferential face adapted to be scanned by the deflected light beam to form a scanning line while being moved in a second direction perpendicular to the first direction, thereby forming a latent image thereon, wherein:
in a case where a virtual scanned face is defined as a plane including the scanning line and orthogonal to an optical axis of the optical scanner, and a scanned face is defined as a tangential plane of the outer circumferential face including the scanning line, the optical scanner and the photoconductive drum are arranged such that:
the shape of a beam spot formed by the light beam incident on the virtual scanned face is approximated to an ellipse; and
the scanned face is inclined from the virtual scanned face about the scanning line with an inclined angle that depends on an inclined angle of a major axis of the ellipse from the second direction on the virtual scanned face, wherein:
the latent image is for a monochrome image;
a distortion level of a beam spot formed on the scanned face is defined by the following equation:

(A−B)/min (A, B)×100(%)

where A represents a dimension in a direction of an inclination at +45 degrees relative to the first direction when an intensity of the beam spot becomes 17% of a peak intensity; B represents a dimension in a direction of an inclination at −45 degrees, relative to the first direction when an intensity of the beam spot becomes 17% of a peak intensity; and "min (A, B)" represents A or B which is smaller; and
a difference between maximum and minimum values of the distortion level of the beam spot on the scanning line is not greater than 35%.

2. An image forming apparatus, comprising:
an optical scanner, which emits a light beam in accordance with an image forming signal and deflects the light beam in a first direction; and
a photosensitive drum, having an outer circumferential face adapted to be scanned by the deflected light beam to form a scanning line while being moved in a second direction perpendicular to the first direction, thereby forming a latent image thereon, wherein:
in a case where a virtual scanned face is defined as a plane including the scanning line and orthogonal to an optical axis of the optical scanner, and a scanned face is defined as a tangential plane of the outer circumferential face including the scanning line, the optical scanner and the photoconductive drum are arranged such that:
the shape of a beam spot formed by the light beam incident on the virtual scanned face is approximated to an ellipse; and
the scanned face is inclined from the virtual scanned face about the scanning line with an inclined angle that depends on an inclined angle of a major axis of the ellipse from the second direction on the virtual scanned face, wherein:
the latent image is for a color image obtained by superposing a plurality of monochrome images one on another;
a distortion level of a beam spot formed on the scanned face is defined by the following equation:

(A−B)/min (A, B)×100(%)

where A represents a dimension in a direction of an inclination at +45 degrees relative to the first direction when an intensity of the beam spot becomes 17% of a peak intensity; B represents a dimension in a direction of an inclination at −45 degrees when an intensity of the beam spot becomes 17% of a peak intensity, relative to the first direction; and "min (A, B)" represents A or B which is smaller; and a difference between maximum and minimum values of the distortion level of the beam spot on the scanning line is not greater than 25%.

3. The image forming apparatus as set forth in claim 1 or 2, wherein:

a positive direction of a first axis is defined as a direction that the light beam is scanned;

a positive direction of a second axis is defined as a direction that the light beam advances through the virtual scanned face in a normal direction thereof;

the scanned face is inclined clockwise as seen in the positive direction of the first axis in a case where the major axis of the ellipse rotates clockwise as seen in the positive direction of the second axis when the beam spot moves in the positive direction of the first axis; and the scanned face is inclined counterclockwise as seen in the positive direction of the first axis in a case where the major axis of the ellipse rotates counterclockwise as seen in the positive direction of the second axis when the beam spot moves in the positive direction of the first axis.

4. The image forming apparatus as set forth in claim 1 or 2, wherein:

the optical scanner comprises a light source which emits the light beam, and a reflection face which reflects the light beam coming from the light source while deflecting in the first direction; and the light beam is incident onto the reflection face obliquely in the second direction relative to the optical axis.

5. The image forming apparatus as set forth in claim 1 or 2, wherein:

the optical scanner comprises an optical system which focuses the deflected light beam onto the scanned face; and at least one optical face in the optical system is eccentrically provided relative to the optical axis.

6. The image forming apparatus as set forth in claim 1 or 2, wherein:

the optical scanner comprises an optical system which focuses the deflected light beam onto the scanned face; and at least one optical face in the optical system is inclined in the second direction relative to the optical axis.

7. The image forming apparatus as set forth in claim 1 or 2, wherein the optical scanner comprises:

a light emitter, which emits the light beam;

a movable reflection face, which reflects the light beam coming from the light source; and at least two fixed reflection faces, which reflect light beam once reflected by the movable reflection face so as to return the light beam to the movable reflection face again, thereby the light beam twice reflected by the movable reflection face is deflected in the first direction.

* * * * *